(12) United States Patent
Wong

(10) Patent No.: US 7,814,330 B2
(45) Date of Patent: Oct. 12, 2010

(54) METHOD AND APPARATUS FOR FACILITATING MULTI-LEVEL COMPUTER SYSTEM AUTHENTICATION

(75) Inventor: Daniel ManHung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1043 days.

(21) Appl. No.: 11/195,016

(22) Filed: Aug. 1, 2005

(65) Prior Publication Data
US 2007/0028117 A1 Feb. 1, 2007

(51) Int. Cl.
G06F 11/30 (2006.01)
(52) U.S. Cl. ........................................ 713/182; 380/287
(58) Field of Classification Search .................. 709/225; 713/193, 182, 168, 201, 202; 380/287
See application file for complete search history.

(56) References Cited

U.S. PATENT DOCUMENTS

| | | | | |
|---|---|---|---|---|
| 6,711,681 | B1 * | 3/2004 | Al-Salqan et al. ........... | 713/184 |
| 2003/0154406 | A1 * | 8/2003 | Honarvar et al. ............ | 713/201 |
| 2004/0250139 | A1 * | 12/2004 | Hurley ........................ | 713/202 |
| 2005/0010767 | A1 * | 1/2005 | Craft ........................... | 713/168 |
| 2005/0033974 | A1 * | 2/2005 | Ansell et al. ................. | 713/193 |
| 2005/0039032 | A1 * | 2/2005 | Babowicz et al. ........... | 713/193 |
| 2005/0188226 | A1 * | 8/2005 | Kasatani ...................... | 713/201 |
| 2006/0053296 | A1 * | 3/2006 | Busboom et al. ............. | 713/182 |
| 2007/0198713 | A1 * | 8/2007 | Tsao et al. ................... | 709/225 |

OTHER PUBLICATIONS

Donggang Liu ; Multilevel µTESLA: Broadcast authentication for distributed sensor networks : ACM Transactions on Embedded Computing Systems (TECS0; vol. 3, Issue 4; pp. 800-836 Year of Publication: 2004.*

* cited by examiner

*Primary Examiner*—Kambiz Zand
*Assistant Examiner*—Monjour Rahim
(74) *Attorney, Agent, or Firm*—Park, Vaughan & Fleming LLP

(57) ABSTRACT

One embodiment of the present invention provides a system that facilitates authenticating a user at a computer system. During operation, the system creates an authentication profile and assigns the authentication profile to a user, wherein the authentication profile specifies authentication criteria. Next, the computer system receives a login request from the user, and in responding to the login request, the computer system checks if the authentication criteria in the authentication profile are satisfied. If so, the system allows the user to login. If not, the user is prevented from logging into the computer system.

17 Claims, 5 Drawing Sheets

METHOD AND APPARATUS FOR FACILITATING MULTI-LEVEL COMPUTER SYSTEM AUTHENTICATION

BACKGROUND

1. Field of the Invention

The present invention relates to computer system security. More specifically, the present invention relates to a method and apparatus for facilitating multi-level computer system authentication.

2. Related Art

Today, the most common form of computer system authentication is the basic computer system login. In a typical computer system login sequence, the user provides a user identifier and a credential that matches the user. Typically, the credential is a user-selected password. Generally, this does not provide a very high level of security due to the relatively insecure nature of passwords.

Biometrics solves many of the problems associated with the basic computer system login. However, most users are uncomfortable with biometric solutions, because they are often viewed as invasive. Furthermore, the level of security provided by biometrics drops significantly when the user attempts a remote login. In most cases biometrics are not available for remote authentication which leaves a computer administrator with two choices, either (1) settle for decreased security or (2) deactivate remote logins. In most environments, neither of these choices is an acceptable solution.

Smart cards are not as invasive as biometrics, but for remote logins smart cards suffer from similar drawbacks. For example, the level of security drops for remote logins and smart card readers are not always available at locations to allow remote logins. Additionally, there is a risk that the smart cards could be lost or stolen.

One-time passwords are another solution, but they increase overhead in terms of both user time and resources required to generate one-time passwords. Overhead is increased even further by the resources required to provide the one-time passwords to the user and then to validate the one-time password when they are used. Moreover, information that a user provides to obtain a one-time password can be intercepted by adversaries who, upon acquiring the information, can obtain their own one-time password.

Organizations typically restrict the manner in which different users can access various computer system resources and applications. This typically involves authenticating users every time they attempt to access a new system and/or resource, or verifying permission and/or privilege levels. These operations can generate a significant amount of overhead because resources must be used to perform the authentication and privilege checks.

Company policies are often difficult to enforce. A user may have permission to access a computer system, but the company might want to restrict the user from accessing certain machines, such as a central server. Using different authentication systems for different computers increases overhead. If a user's access to different computer systems changes, each authentication system must be separately updated to account for the change in a user's ability to access the system, which may involve adding or removing the user from the authentication system.

Additionally, a company may want to restrict remote login for one user, but not for another. For example, the CEO might be granted access to all systems regardless of the CEO's location, but a new employee might only be granted access from within the company's walls.

While security is important, it is not the only concern that can be addressed by systems that restrict access to computer systems. A company may want to restrict which users can login at certain peak periods in order to prevent excessive system load. For example, a company might want to prevent most users from logging into machines during a system upgrade, but may allow a few selected users to login for emergency purposes.

Hence, what is needed is a method for authenticating users at a computer system without the problems listed above.

SUMMARY

One embodiment of the present invention provides a system that facilitates authenticating a user at a computer system. During operation, the system creates an authentication profile and assigns the authentication profile to a user, wherein the authentication profile specifies authentication criteria. Next, the computer system receives a login request from the user, and in responding to the login request, the computer system checks if the authentication criteria in the authentication profile are satisfied. If so, the system allows the user to login. If not, the user is prevented from logging into the computer system.

In a variation of this embodiment, the user is granted a set of privileges upon logging into the system. These privileges are granted based on the authentication profile, which previously allowed the user to log into the system.

In a variation of this embodiment, the authentication profile is assigned to more than one user.

In a variation of this embodiment, the authentication criteria can include: an IP address, a client program, a time range, a credential, or any other authentication mechanism.

In a variation of this embodiment, multiple authentication profiles can be assigned to a user.

In a further variation, the authentication profiles are prioritized.

In a further variation, the system checks all authentication profiles assigned to the user.

In a further variation, in response to the login request, the authentication module checks if the authentications criteria in the highest priority authentication profile have been met. If so, the system allows the user to finish logging in. If not, the authentication module checks the next highest priority authentication profile. If no more authentication profiles exist, the user is prevented from logging into the system.

In a variation of this embodiment, the system sends a request to an authentication module to perform the authentication.

In a variation of this embodiment, preventing the user from logging into the system involves initiating secondary actions. The secondary actions can include: preventing further login attempts from the user; preventing further login attempts from the computer system; reporting failed login attempts; logging further activity; and any other action in response to a failed login attempt.

In a variation of this embodiment, the system can include a database.

DETAILED DESCRIPTION

Figure 1:
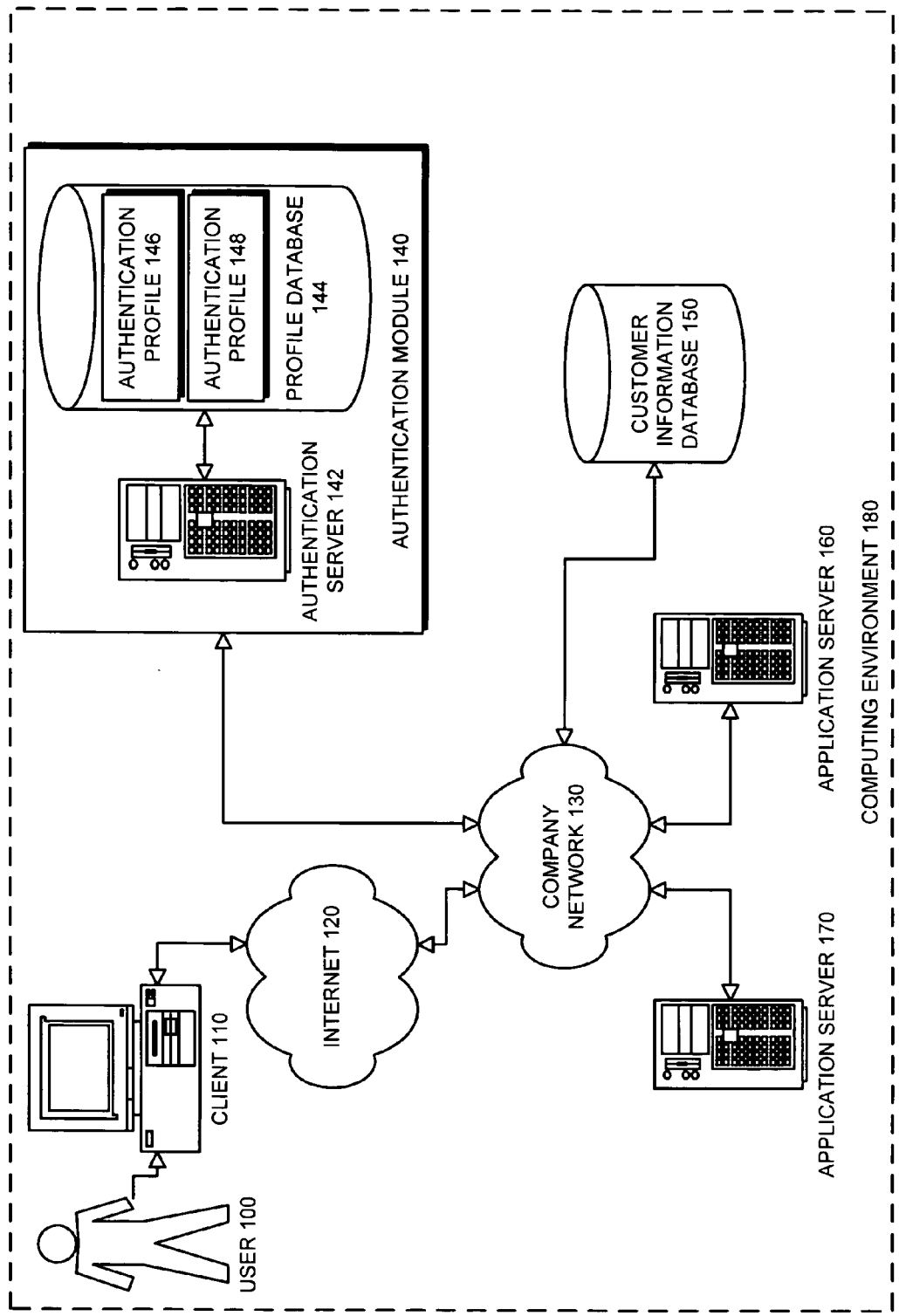
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Overview

The present invention provides a method for facilitating the enforcement of an organization's policy. In one embodiment of the present invention, an administrator creates authentication profiles for each user of a computer system. Each authentication profile may include: information for identifying the profile; information for identifying which users the authentication profile is meant to authenticate; authentication criteria that the user must satisfy in order to be authenticated; and a privilege set that indicates which privileges a user who was authenticated with that authentication profile should have.

In another embodiment of the present invention, the authentication criteria can be prioritized and grouped. This means that a user can be authenticated in several different ways in order to obtain the same privileges.

In another embodiment of the present invention, authentication profiles can be prioritized such that there is more than one way that a user can be authenticated. This means that a user can obtain different privileges depending on what authentication criteria the user is able to meet at a given login attempt.

In yet another embodiment of the present invention, authentication criteria can be grouped and prioritized, and authentication profiles can be prioritized. This allows for increased flexibility and control over what privileges a user can have at any given moment in time.

Once the administrator has completed associating profiles with users, users can attempt to login to the computer system. When this occurs, an authentication module checks the highest priority authentication profile associated with the user, and determines if the user can be authenticated, and if so, what privileges should be assigned to the user.

If a user cannot be authenticated, the computer system can initiate secondary actions, such as blocking further logins associated with the user, or any other possible secondary actions associated with a failed login attempt.

Computing Environment

FIG. 1 illustrates computing environment 180 in accordance with an embodiment of the present invention. Computer environment 180 can generally include any type of computer system, including, but not limited to, a computer system based on a microprocessor, a mainframe computer, a digital signal processor, a portable computing device, a personal organizer, a device controller, and a computational engine within an appliance. Computing environment 180 includes user 100 who uses client 10 to attempt to login to company network 130 through Internet 120. Company network 130 can generally include any type of wired or wireless communication channel capable of coupling together computing nodes. This includes, but is not limited to, a local area network, a wide area network, or a combination of networks. In one embodiment of the present invention, network 130 includes the Internet. For emphasis, FIG. 1 separates company network 130 and Internet 120.

Client 110 can generally include any node on a network including computational capability and including a mechanism for communicating across the network. During operation, client 110 sends user 100's login request to authentication module 140 via company network 130. (Additionally, company network 130 has links to customer information database 150 and application servers 160 and 170.)

Database 150 can include any type of system for storing data in non-volatile storage. This includes, but is not limited to, systems based upon magnetic, optical, and magneto-optical storage devices, as well as storage devices based on flash memory and/or battery-backed up memory.

Servers 160, 170 and 142 can generally include any nodes on a computer network including a mechanism for servicing requests from a client for computational and/or data storage resources.

Authentication module 140 includes authentication server 142 and profile database 144. Furthermore, profile database 144 has two authentication profile entries, authentication profile 146 and authentication profile 148.

Note that authentication module 140 is not limited to two authentication profiles and may generally include any number of authentication profiles. The following discussion uses FIG. 1 to illustrate how one embodiment of the present invention could be used. However, note that it is only an example, and is not meant to be inclusive of all possible applications of the present invention.

Example Operation

Assume company network 130 belongs to company Z. Also assume application server 170 is running most of company Z's applications, which do not interact with sensitive information such as classified documents. However, application server 160 is running applications that interact with sensitive information. Note that customer information database 150 is used to store important customer information such as social security numbers and credit card numbers.

Any user who can access application server 170 when at company Z's campus can also access application server 170 from outside of company Z's campus.

Furthermore, assume that a company policy prevents any user who is not at least a vice-president from accessing application server 160 and customer information database 150 from outside the campus of company Z even if the user has access from within the company campus.

During system operation, a user 100 of client 110 attempts a remote login to company network 130. In this example, user 100 is lower in the company hierarchy than a vice-president. In response to the remote login request, a network node belonging to company network 130 contacts authentication module 140 with the user login request. This network node can generally include any type of communication device capable of communicating with other network nodes via a communication network. This includes, but is not limited to, a computer system based on a microprocessor, a mainframe computer, a printer, a router, a switch, a personal organizer, and a mobile phone.

In response to contact by the network node, authentication module 140 checks the authentication profiles and authenticates user 100 on company network 130. However, since user 100 is not at least a vice-president, user 100 is only given authorization to contact application server 170. Because privileges are associated with the login, no further authentication checks are required to prevent user 100 from accessing application server 160, or customer information database 150.

In one embodiment of the present invention, a user 100 of client 110 contacts application server 170 via company network 130. Note that any user is allowed to attempt to login to application server 170 via company network 130. In this embodiment, application server 170 then contacts authentication module 140 via company network 130 to authenticate user 100 and to determine whether user 100 has permission to login to application server 170.

Note that any computer system, or any network of computer systems can be used with the present invention. Furthermore, a computer system can generally include any type of computer system, including, but not limited to, a computer system based on a microprocessor, a mainframe computer, a digital signal processor, a portable computing device, a personal organizer, a device controller, and a computational engine within an appliance.

Authentication Profiles

The authentication module 140 can include any type of computer system, database, or authentication-determining device. Authentication module 140 includes authentication server 142 and profile database 144, wherein profile database 144 includes authentication profiles 146 and 148.

Authentication criteria are the criteria that must be satisfied for a user to be authenticated. In one embodiment of the present invention, it is not necessary that all authentication criteria are satisfied for a user to be authenticated. Furthermore, authentication criteria can be prioritized to reflect the authentication criteria that are most important for user authentication. For example, if a user is logging in from an internal IP address and has a proper credential, then the user is allowed to continue logging in. However, if the IP address is not an internal IP address, then additional authentication criteria, such as time range, is checked. The purpose of checking the time range is to prevent too many external logins during peak business hours.

In a further embodiment of the present invention, a second authentication profile is used instead of prioritized authentication criteria. In this embodiment, the above example is altered so that the authentication profile is split into two authentication profiles which are then prioritized to reflect the difference between an internal and external login attempt.

Figure 2:
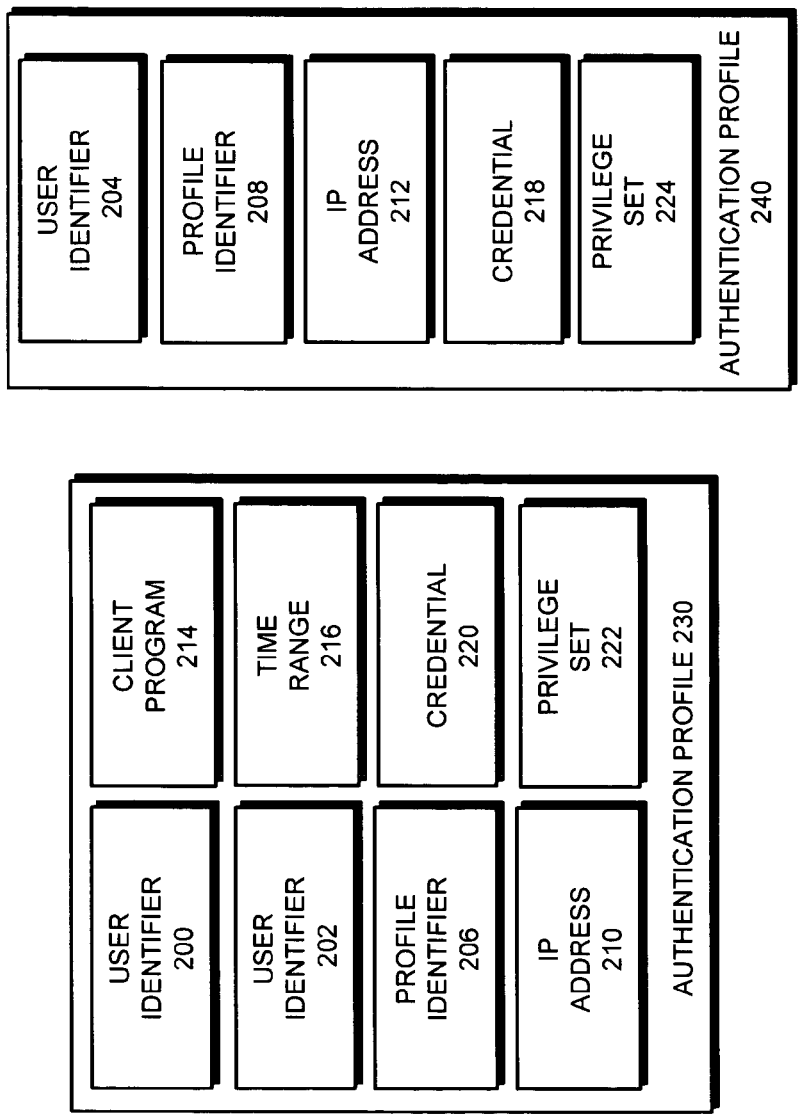
FIG. 2 illustrates a number of authentication profiles in accordance with an embodiment of the present invention.

FIG. 2 illustrates two exemplary authentication profiles in accordance with an embodiment of the present invention. Authentication profile 230 has more authentication criteria than authentication profile 240. Note the authentication profile generally includes: authentication criteria, authentication identifiers, and a privilege set.

Authentication profile 230 includes user identifiers 200 and 202, profile identifier 206, IP address 210, client program 214, time range 216, credential 220, and privilege set 222. Authentication profile 240 includes user identifier 204, profile identifier 208, IP address 212, credential 218, and privilege set 224.

Profile identifiers 206 and 208 are used for prioritizing the authentication profiles. Profile database 144 uses the profile identifiers to order each authentication profile associated with a user to reflect the priority that the authentication profile should have.

User identifiers 200, 202, and 204 determine which users should use authentication profiles 230 and 240 for authentication.

IP addresses 206, and 212, client program 214, time range 216, and credentials 218, and 220 represent the authentication criteria. Note that these are merely examples of possible authentication criteria.

Privilege sets 222, and 224 identify the privileges that are associated with an authentication profile. These privilege sets indicates what a user can and cannot do if authenticated.

A user may have multiple authentication profiles, having different authentication criteria, because depending on circumstances, a company may want to vary what privileges a user is given as was illustrated in the example in the previous section.

Assigning Authentication Profiles

Figure 3:
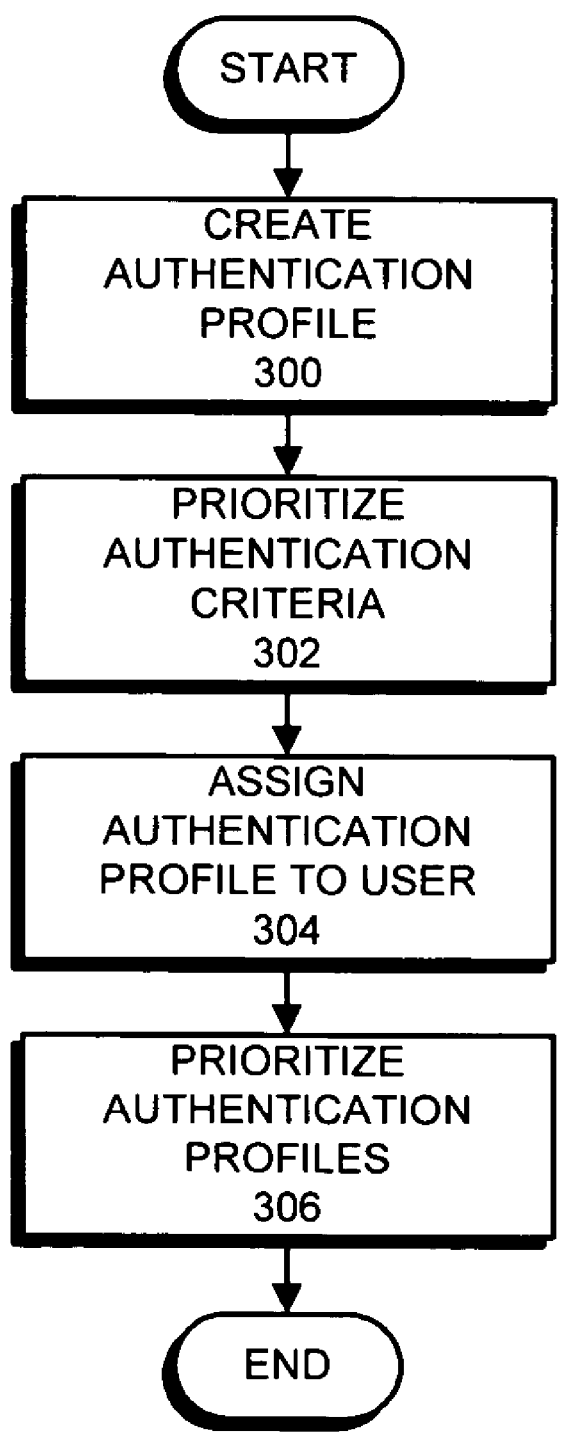
FIG. 3 presents a flowchart illustrating the process of creating and assigning authentication profiles in accordance with an embodiment of the present invention.

FIG. 3 presents a flowchart illustrating the process of creating and assigning of authentication profiles in accordance with an embodiment of the present invention. The process begins with the system creating an authentication profile (step 300). Once the profile has been created, the system prioritizes the authentication criteria which have been added to the authentication profile (step 302).

The administrator then assigns the authentication profile to the applicable user (step 304).

In one embodiment of the present invention, the administrator can assign the authentication profile to multiple users.

Finally, the system prioritizes the authentication profiles in accordance with company policy (step 306).

In one embodiment of the present invention, the authentication profile could include a fingerprint biometric. In this embodiment, any user who submits to fingerprinting can have an authentication profile that verifies the user's fingerprint. However, a lower priority authentication profile may be created for situations when the user is attempting to login at a client that does not include a fingerprint scanner.

Logging into a Computer System

Figure 4:
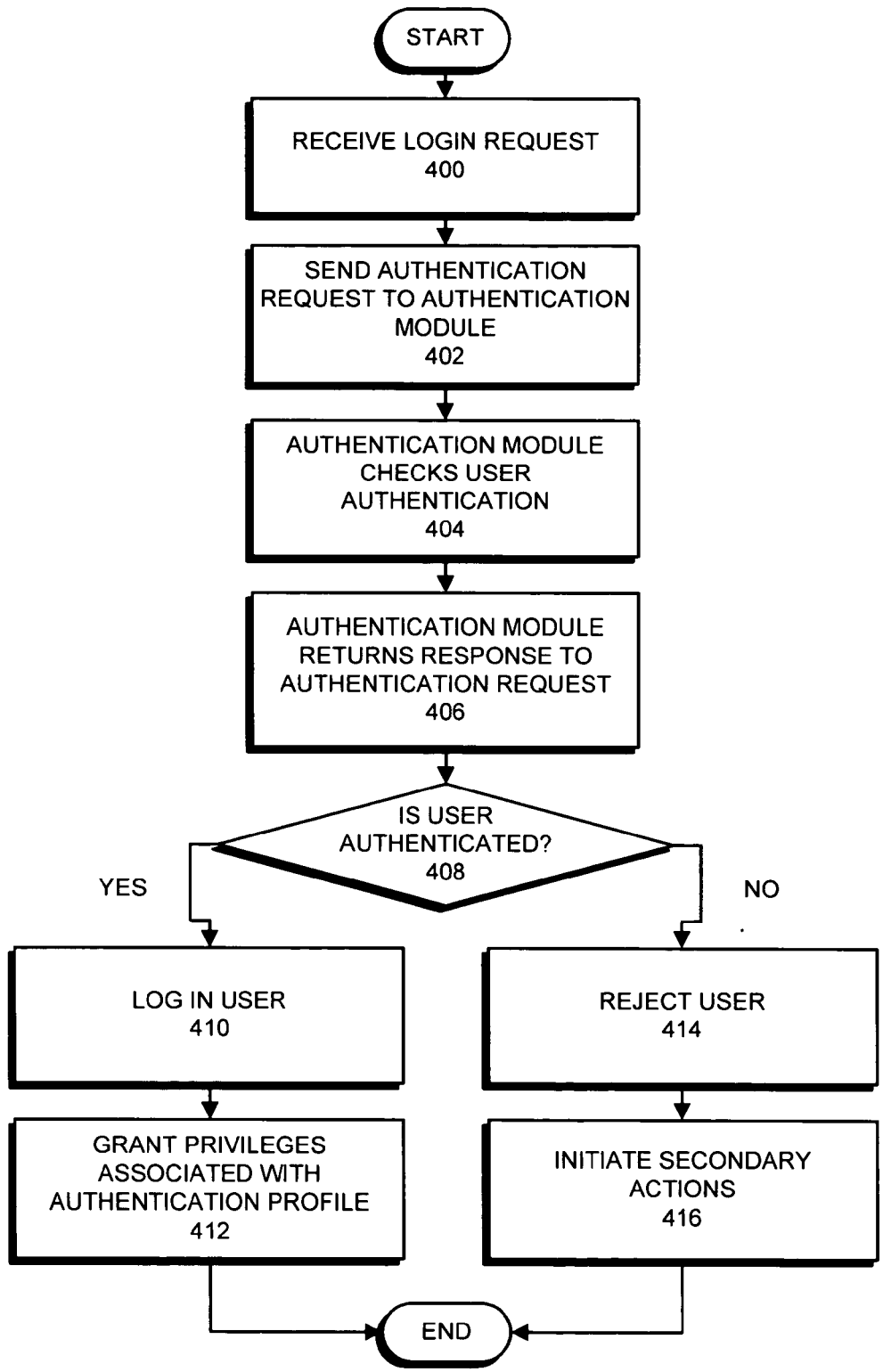
FIG. 4 presents a flowchart illustrating the process of authenticating a user in accordance with an embodiment of the present invention.

FIG. 4 presents a flowchart illustrating a user's attempt to login into a computer system in accordance with an embodiment of the present invention. The process begins when a computer system receives a login request (step 400). The computer system then sends an authentication request to the authentication module (step 402).

The authentication module then checks the user authentication (step 404). Upon determining the authentication status of the user, the authentication module returns the result to the computer system (step 406). This result not only includes whether or not the user has permission to login, but it also includes what privileges the user should be granted.

The computer system then determines whether the user was authenticated (step 408). If the user was authenticated, then the user is allowed to login (step 410) and is given the privileges listed in the authentication profile that matched the authentication request (step 412). If the user was not authenticated, then the user is not allowed to logon (step 414). After a user is not allowed to logon, secondary actions can be initiated according to company policy.

Authentication Module

Note that the authentication module may or may not be part of the computer system. Furthermore, the steps the authentication module executes vary based on the embodiment of the present invention.

Figure 5:
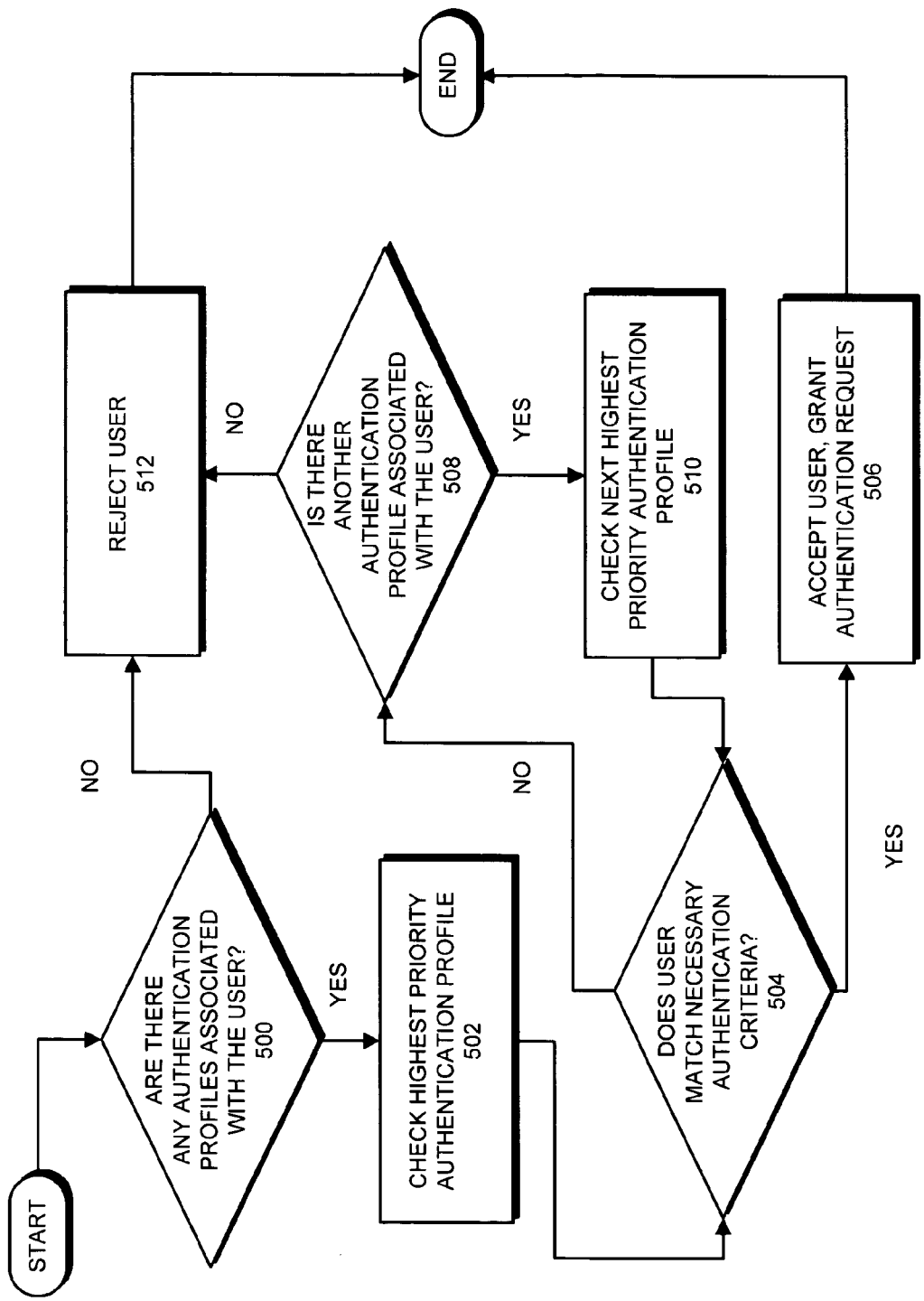
FIG. 5 presents a flowchart illustrating multi-profile user authentication in accordance with an embodiment of the present invention.

FIG. 5 presents a flowchart illustrating how the authentication module authenticates a user in accordance with an embodiment of the present invention. The system starts by determining if the user seeking authentication is associated with any profiles (step 500). If not, it is likely that the user is not an employee or legal user of the computer system and is rejected out right (step 512).

If authentication profiles are associated with the user, then the system checks the highest priority authentication profile (step 502). The authentication module then determines if the user matches the necessary authentication criteria (step 504). If so, the authentication module returns a response indicating that the user is authenticated and is granted permission to login (step 506).

If not, the authentication module checks if the user is associated with any additional authentication profiles (step 508). If so, the authentication module checks the next highest priority authentication profile (step 510). This process repeats until the user is authenticated, or until there are no remaining authentication profiles associated with the user. In this case, the user is rejected (step 512).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for authenticating a user at a computer system comprising:
    associating one or more authentication profiles prioritized in a priority order with the user at the computer system, wherein each authentication profile specifies authentication criteria and a set of privileges, and wherein a high priority authentication profile is associated with stricter authentication criteria and more privileges than a low priority authentication profile;
    in response to a user login request, checking one or more authentication profiles in the priority order to determine whether all the authentication criteria corresponding to an authentication profile are satisfied;
    if so, logging the user into the computer system granting the set of privileges specified in the authentication profile;
    if not, preventing the user from logging into the computer system.

2. The method of claim 1, wherein logging the user into the computer system further involves associating the set of privileges with the user.

3. The method of claim 1, wherein the authentication profile is assigned to more than one user.

4. The method of claim 1, wherein the authentication criteria includes at least one of:
    an IP address;
    a client program;
    a time range; or
    a credential.

5. The method of claim 1, wherein the computer system checks all authentication profiles assigned to the user, whereby the method further comprises:
    in response to the login request, checking if authentication criteria in the highest priority authentication profile are met;
    if so, logging the user into the computer system;
    if not, checking if authentication criteria in the next highest priority authentication profile are met; and
    if there are no remaining authentication profiles, preventing the user from logging into the computer system.

6. The method of claim 1, wherein the computer system sends a request to an authentication module to perform the authentication.

7. The method of claim 1, wherein preventing the user from logging into the computer system involves secondary actions, wherein secondary actions comprise at least one of:
    preventing further login attempts from the user;
    preventing further login attempts from the computer system;
    reporting failed login attempts;
    logging further activity; and
    any other action in response to a failed login attempt.

8. A non-transitory computer-readable storage medium storing instructions that when executed by a computer cause the computer to perform a method for authenticating a user at a computer system, the method comprising:
    associating one or more authentication profiles prioritized in a priority order with the user at the computer system, wherein each authentication profile specifies authentication criteria and a set of privileges, and wherein a high priority authentication profile is associated with stricter authentication criteria and more privileges than a low priority authentication profile;
    in response to a user login request, checking one or more authentication profiles in the priority order to determine whether all the authentication criteria corresponding to an authentication profile are satisfied;
    if so, logging the user into the computer system granting the set of privileges specified in the authentication profile;
    if not, preventing the user from logging into the computer system.

9. The non-transitory computer-readable storage medium of claim 8, wherein logging the user into the computer system further involves associating the set of privileges with the user.

10. The non-transitory computer-readable storage medium of claim 8, wherein the authentication profile is assigned to more than one user.

11. The non-transitory computer-readable storage medium of claim 8, wherein the authentication criteria includes at least one of:
    an IP address;
    a client program;
    a time range; or
    credential.

12. The non-transitory computer-readable storage medium of claim 8, wherein the computer system checks all authentication profiles assigned to the user.

13. The non-transitory computer-readable storage medium of claim 8, wherein the computer system sends a request to an authentication module to perform the authentication.

14. The non-transitory computer-readable storage medium of claim 8, wherein preventing the user from logging into the computer system involves secondary actions, wherein secondary actions comprise at least one of:
- preventing further login attempts from the user;
- preventing further login attempts from the computer system;
- reporting failed login attempts;
- logging further activity; and
- any other action in response to a failed login attempt.

15. The non-transitory computer-readable storage medium of claim 8, wherein the computer system can include a database.

16. The non-transitory computer-readable storage medium of claim 12, wherein the method further comprises: in response to the login request, checking if authentication criteria in the highest priority authentication profile are met;
- if so, logging the user into the computer system;
- if not, checking if authentication criteria in the next highest priority authentication profile are met; and
- if there are no more authentication profiles, preventing the user from logging into the computer system.

17. An apparatus that authenticates a user at a computer system comprising:

An associating mechanism configured to associate one or more authentication profiles to the with the user,
- wherein each authentication profile specifies authentication criteria and a set of privileges;

an ordering mechanism configured to determine a priority order for the authentication profiles assigned to the user, wherein a high priority authentication profile is associated with stricter authentication criteria and more privileges than a low priority authentication profile;

a checking mechanism configured to check the authentication profiles in the priority order to determine whether all authentication criteria corresponding to an authentication profile are satisfied in response to a user login request;

a login mechanism, wherein, if the authentication criteria are satisfied, the login mechanism is configured to log the user into the computer system granting the set of privileges specified in the authentication profile; and wherein, if the authentication criteria are not satisfied, the login mechanism is further configured to prevent the user from logging into the computer system.

* * * * *

UNITED STATES PATENT AND TRADEMARK OFFICE
CERTIFICATE OF CORRECTION

PATENT NO. : 7,814,330 B2
APPLICATION NO. : 11/195016
DATED : October 12, 2010
INVENTOR(S) : Daniel ManHung Wong It is certified that error appears in the above-identified patent and that said Letters Patent is hereby corrected as shown below:

In column 4, line 16, delete "10" and insert -- 110 --, therefor.

In column 10, line 1, in claim 17, delete "An" and insert -- an --, therefor.

In column 10, line 2, in claim 17, after "the" delete "with the".

Signed and Sealed this
Seventeenth Day of May, 2011

David J. Kappos
*Director of the United States Patent and Trademark Office*